United States Patent Office 3,356,498
Patented Dec. 5, 1967

3,356,498
ELECTROPHOTOGRAPHIC METHOD COMPRISING RINSING THE IMAGED PLATE
Clyde A. Moe, Sanford, Mich., and Henderson C. Gillespie, Moorestown, N.J., assignors to The Dow Chemical Company, Midland, Mich., a corporation of Delaware
No Drawing. Filed Nov. 9, 1964, Ser. No. 409,991
6 Claims. (Cl. 96—1)

This invention relates to electrophotographic printing processes in general and more particularly relates to a new and novel rinsing liquid having a high flash point, a high electrical resistivity, and a low toxicity, which is economical and safe, thus highly useful in rinsing imaged electrophotographic plates.

Exemplary of an electrophotographic printing process for preparing photoengraving plates is one wherein a photoconductive composition comprising, for example, a photoconductive zinc oxide suspended as a fine dispersion of micron sized particles in a cross-linkable, film forming, insulating silicone resin as a binder, is coated on, for instance, a thin magnesium plate. The plate so-coated, commonly referred to as a recording element, is then negatively electrostatically charged and exposed to an illuminated image desired to be reproduced, thereby to form a latent electrostatic image. This latent image is then developed, for example, by first contacting said latent image with triboelectric catalyst particles of, for example, aluminum octanoate, suspended, for instance, in a carrier liquid of n-heptane. Following said contact, the coating, now catalyzed with said triboelectric catalyst in a pattern conforming to the electrostatic image, is conventionally rinsed in, for example, a liquid comprising primarily isooctane containing various resinous additives in order to wash off the developing solution and the excess deposition of catalyst. Thereafter, the rinsed plate is cured (cross-linked) by heating to convert the resin binder in the composition to an acid etchant resist, followed by removal of the composition from the nonimage areas of the coating, whereupon, the plate may be etched, for example, by means of the recently developed powderless etching process.

The rinses heretofore used for electrophotographic plates as hereinbefore described are substantially unacceptable in that several serious disadvantages attend their use. For example, these rinses are uneconomical requiring in some cases expensive resinous additives. Moreover, they are highly flammable, thus represent a significant safety hazard. For example, isooctane has a flash point of about 12° F. In addition, some of the rinse ingredients are quite toxic to handle and inhale, thus, in addition to being flammable, are deleterious to health as well. Also said rinses, in addition to providing only a nominally acceptable rinsing action in general, do not provide clean nonimage areas and sharp images as are desired. The term "rinsing action" as used herein refers to the overall rinsing effectiveness of a given rinse with respect to (1) removing catalyst from the nonimage areas so that the resin in said areas will not cross-link during curing, and (2) removing only the catalyst material in the image areas not electrically and/or poorly adhering thereto.

Ideally then, a rinsing liquid for the purpose heretofore set forth should have a high flash point above, for example, about 100° F. It should thoroughly remove all (but only) excess catalyst, foreign matter and the like from both the image and nonimage areas and have an evaporation rate such as to be capable of being air dried off the plate within, for example, about 5–6 minutes or less after rinsing. Though such a rinse should have a high evaporation rate for fast drying, it should not have an objectionable and irritating odor nor be toxic and irritating to the skin. Also, and very important, such a rinse should leach out of the coating as little of the resinous binder as possible and have a high electrical resistivity, such that a sufficient rinse capacity of, for instance, at least 30 to 40 plates or more can be obtained from one rinse charge.

The object of the present invention, therefore, in the electrophotographic production of photoengraving plates, is to provide a novel and improved, high resistivity, high flash, and non-toxic rinsing liquid which in general provides good rinsing action, and which is also economical, efficient, and safe, for use in electrophotographic printing processes.

Accordingly, the novel rinse liquid of the present invention comprises a colorless isoparaffinic hydrocarbon liquid of exceptional purity having a low Kauri-Butanol (KB) value, an extremely low odor and toxicity level, a high flash point 104° F. (TCC), a high electrical resistivity ($2.7 \times 10^{13}$ ohms per cm.), and high evaporation rate (3180″ at 100 percent). More specifically, this hydrocarbon liquid, known by the trade name of "Isopar G" and manufactured by the Humble Oil and Refining Company, has a Kauri-Butanol (KB) value of 27, an average molecular weight of about 146, is comprised of about 99.7 percent by weight of paraffins having from 9 to 12, inclusive, carbon atoms, and has a boiling range of from about 318° to 315° F., the balance being minor amounts of various aromatics and olefins.

In practicing the invention, the Isopar G rinse liquid is charged into a suitable rinse tank, which may be a flat tank or preferably a spray/rinse tank such as manufactured by the Master Etch Machine Co. This machine is equipped with a spray head to provide a uniform spray curtain through which the plate must pass to be immersed and withdrawn from the tank. A plate to be rinsed, after having been contacted with the aforesaid catalyst material, is then immersed in and withdrawn from said tank, for example, from about 2 to about 10 times, and preferably 3 to 4 times, to provide inversely a suitable contact time of, for example, from about 3 to about 8 seconds per immersion-withdrawal. Upon the last withdrawal the plate is allowed to drain and then dried either in air or by forced air, preferably the latter. The plate so-rinsed is then subjected to the remaining steps of preparing a photoengraving plate as described above. The present novel rinse liquid is good, for example, for rinsing a minimum of about 100 full size (18″ x 24″) plates, or "flats" as they are called, thus, it is excellent for use as a rinse.

The present invention, therefore, provides a high flash, high resistivity, non-toxic rinsing liquid highly useful in rinsing imaged and developed photoconductive-coated electrophotographic printing plates, containing in said coating a cross-linking binder and a photoconductive zinc oxide. It provides, moreover, a novel and improved rinsing liquid having good rinsing action, which is economical, efficient, and safe such that when used in the electrophotographic preparation of, for example, photoengraving plates, a significant improvement is obtained.

The following examples further illustrate the present invention but are not to be construed as limiting the invention thereto.

*Example I*

A number of photoengraving grade magnesium plates each 18″ x 20″ in size and about 0.064″ in thickness were spray coated with a zinc oxide-silicone binder photoconductive composition. These plates were then further electrophotographically processed to the point of rinsing by electrostatically negatively charging, followed by exposing them to a light image and contacting the plates so-exposed with an aluminum octanoate cross-linking promoting catalyst suspended in a carrier liquid.

A 10 liter capacity rinse tank of the type hereinbefore described was then readied by charging it to capacity with the present novel rinse liquid, Isopar G. The above prepared plates were then rinsed therein by immersing and withdrawing them out through the spray curtain provided in the machine about 4 times, with each immersion and withdrawal sequence being about 3 seconds in duration. After rinsing, each plate was allowed to completely dry in air for about 5 minutes. Subsequent processing of the plates including powderless etching produced excellent quality image areas, that is, the areas covered by a photoresist and also, clear, substantially resist-free, nonimage areas.

This example shows that a good rinsing action was obtained in the nonimage areas while yet not washing off detrimental amounts of the catalyst deposition in the image areas. This together with its safety features, i.e., its high flash point, and relatively low toxicity, provides a new and novel rinse liquid highly suitably for use in making high quality photoengraving plates.

*Example II*

The procedure and activity of Example I was repeated except that the plates were immersed and withdrawn in and out of the rinse about 10 times. In this case the rinsing action was good in the nonimage areas but the images produced were of a slightly lesser quality than previously obtained, but still very usable, showing that more catalyst was removed from the coating in the image areas than in Example I.

*Example III*

Example I was again repeated except that the plates were immersed and withdrawn twice. In this case, the images produced subsequently were usable and of acceptable good quality but were not quite as sharply defined since a less than desirable amount of catalyst was removed from the nonimage areas. Accordingly, the nonimage areas after etching exhibited more pimple-like projections than when like plates were rinsed four times as in Example I.

The immersion times may vary from those used in the examples depending on the number of rinses (immersion-withdrawals) employed, strength of the rinse, and the like.

It is manifest that various modifications can be made in the process of the present invention without departing from the spirit or scope thereof and it is understood that we limit ourselves only as defined in the appended claims.

We claim:

1. In the electrophotographic preparation of etchable photoengraving plates including: (a) providing a photoconductive composition comprising, a photoconductive zinc oxide suspended in a cross-linking resinous insulating binder coated on a metal plate, (b) negatively electrostatically charging said coated plate, (c) exposing the charge plate to an illuminated image to form a latent electrostatic image, (d) contacting said latent image with a cross-linking promoting catalyst material, (e) rinsing the plate so-contacted in a rinsing liquid, (f) curing the plate at an elevated temperature (g) removing of the nonimage areas and (h) contacting the so-treated plate with a powderless etching bath; the improvement comprising, rinsing the catalyst-contacted plate with an isoparaffinic hydrocarbon liquid characterized by a Kauri-Butanol valve of about 27, a flash point of about 104° F., and an evaporation rate at 100 percent concentration of 3180 seconds.

2. The improvement of claim 1 wherein the rinsing step comprises contacting said element with the rinsing composition by immersing and withdrawing said plate into and out of said isoparaffinic hydrocarbon rinsing liquid from about 2 to about 10 times.

3. The improvement of claim 2 wherein the element is immersed and withdrawn from about 3 to about 4 times.

4. The improvement of claim 2 wherein the period for immersing and withdrawing the element each time is from about 3 to about 8 seconds.

5. A method of rinsing an electrostatically charged electrophotographic recording element comprising a photoconductive zinc oxide dispersed in a cross-linking insulating resin as a photoconductive mixture coated on a metal plate, which element has first been exposed to an illuminated image then contacted with a cross-linking promoting catalyst, comprising immersing and withdrawing said element through a liquid curtain of an isoparaffinic hydrocarbon from about 2 to about 10 times, said isoparaffin being characterized by a Kauri-Butanol value of about 27, a flash point of about 104° F., and an evaporation rate at 100 percent concentration of about 3180 seconds.

6. The method of claim 5 wherein the period for immersing and withdrawing the element each time is from about 3 to about 8 seconds.

References Cited

UNITED STATES PATENTS

| | | | |
|---|---|---|---|
| 3,062,684 | 11/1962 | Nakamura | 134—40 X |
| 3,215,527 | 11/1965 | Johnson | 96—1 |
| 3,276,896 | 10/1966 | Fisher | 117—37 |

NORMAN G. TORCHIN, *Primary Examiner.*

C. E. VANHORN, *Assistant Examiner.*